United States Patent [19]
Fricke, Sr.

[11] Patent Number: 5,626,006
[45] Date of Patent: May 6, 1997

[54] DOLLY FOR PORTABLE WEED CUTTERS

[76] Inventor: Stanley G. Fricke, Sr., Rte. 4, Box 71, Harrison, Ark. 72601

[21] Appl. No.: 437,896

[22] Filed: May 8, 1995

[51] Int. Cl.$^6$ .................................................. A01D 67/00
[52] U.S. Cl. ........................... 56/12.7; 56/16.7; 30/276
[58] Field of Search .................... 56/12.1, 12.7, 56/16.7; 30/276

[56] References Cited

U.S. PATENT DOCUMENTS

| | | | |
|---|---|---|---|
| 4,182,100 | 1/1980 | Letter | 56/16.7 |
| 4,224,784 | 9/1980 | Hansen et al. | 56/16.9 |
| 4,442,659 | 4/1984 | Enbusk | 56/12.7 |
| 4,704,849 | 11/1987 | Gilbert et al. | 56/17.5 |
| 4,756,147 | 7/1988 | Savell | 56/16.7 |
| 4,829,755 | 5/1989 | Nance | 56/17.1 |
| 4,891,931 | 1/1990 | Holland | 56/16.7 |
| 4,922,694 | 5/1990 | Emoto | 56/16.7 |
| 4,936,886 | 6/1990 | Quillen | 56/16.7 |
| 5,095,687 | 3/1992 | Andrew et al. | 56/12.7 |
| 5,279,102 | 1/1994 | Foster | 56/12.7 |

OTHER PUBLICATIONS

AARP Modern Maturity (Mar.–Apr. 1995) p. 85 Advertisement.

*Primary Examiner*—Terry Lee Melius
*Attorney, Agent, or Firm*—Boyd D. Cox

[57] ABSTRACT

A dolly for portable weed cutters according to the present invention includes a frame provided with upper and lower clamp members for engagement with a handle bar of a conventional portable weed cutter for detachably securing the weed cutter to the dolly. A lower portion of the frame includes a pair of symmetrical lower frame members each having a lower end rotatably mounted on an axle extending transversely between and rotatably mounting a pair of wheels. An upper end of each of the lower frame members is secured to the lower clamp member by virtue of a fastener extending through a selected one of a plurality of apertures provided in a body portion of the lower clamp member such that the lower clamp member is selectively securable in pivotally and linearly adjustable position. The upper clamp member includes a body portion pivotally connected to the upper frame portion. In a first embodiment of the invention, the upper frame portion comprises a single linear strut centrally and transversely connected to the axle. In a second embodiment of the invention, the upper frame portion includes a pair of symmetrical upper frame members each having an upper end pivotally mounted to a body portion of the upper clamp member and a lower end rotatably mounted on the axle, adjacent a respective opposite wheel. The device provides a safe and stable support for a portable weed cutter, while affording a high degree of flexibility in adjustment to accommodate various different brands and types of weed cutters and also to adjust trim head height and angle.

20 Claims, 4 Drawing Sheets

5,626,006

1

DOLLY FOR PORTABLE WEED CUTTERS

BACKGROUND OF THE INVENTION

1. Field of the Invention

The present invention relates to portable weed cutters, for example of the string trimmer type, and more particularly pertains to a wheeled dolly for mounting and supporting a conventional portable weed cutter during use.

2. Description of the Prior Art

The prior art is relatively crowded with respect to the provision of wheeled support devices adapted for attachment to portable string trimmers. Representative examples of such prior art devices are disclosed in U.S. Pat. No. 4,224,784 issued to L. Hansen on Sep. 30, 1980; U.S. Pat. No. 4,442,659 issued to H. Enbusk on Apr. 17, 1994; U.S. Pat. No. 4,704,849 issued to Z. Gilbert et al. on Nov. 10, 1987; U.S. Pat. No. 4,756,147 issued to K. Savell on Jul. 12, 1988; U.S. Pat. No. 4,829,755 issued to N. Nance on May 16, 1989; U.S. Pat. No. 4,891,931 issued to P. Hollan on Jan. 9, 1990; U.S. Pat. No. 4,922,694 issued to C. Emoto on May 8, 1990; U.S. Pat. No. 4,936,886 issued to R. Quillen on Jun. 26, 1990; U.S. Pat. No. 5,095,687 issued to R. Andrew et al. on Mar. 17, 1992; and U.S. Pat. No. 5,279,102 issued to T. Foster on Jan. 18, 1994. The entire disclosures of each of the aforementioned patents are hereby incorporated herein by reference. Of these prior art patents, the device disclosed by U.S. Pat. No. 4,992,694 appears to be the most similar in construction to the dolly of the instant invention, and includes a frame having two spaced wheels and also including upper and lower support members adapted for engagement with the handle bar of a conventional string trimmer. The upper support member comprises a pivotally mounted bifurcated screw actuated clamp, while the lower support member comprises a linearly adjustable abutment-type bracket.

SUMMARY OF THE INVENTION

A dolly for portable weed cutters according to the present invention includes a frame provided with upper and lower clamp members for engagement with a handle bar of a conventional portable weed cutter for detachably securing the weed cutter to the dolly. A lower portion of the frame includes a pair of symmetrical lower frame members each having a lower end rotatably mounted on an axle extending transversely between and rotatably mounting a pair of wheels. An upper end of each of the lower frame members is secured to the lower clamp member by virtue of a fastener extending through a selected one of a plurality of apertures provided in a body portion of the lower clamp member, such that the lower clamp member is selectively securable in pivotally and linearly adjustable positions. The upper clamp member includes a body portion pivotally connected to the upper frame portion. In a first embodiment of the invention, the upper frame portion comprises a single linear strut centrally and transversely connected to the axle. In a second embodiment of the invention, the upper frame portion includes a pair of symmetrical upper frame members each having an upper end pivotally mounted to a body portion of the upper clamp member and a lower end rotatably mounted on the axle, adjacent the respective opposite wheels. The device provides a safe and stable support for a portable weed cutter, while affording a high degree of flexibility in adjustment to accommodate various different brands and types of weed cutters, and also to adjust trim head height and angle.

These and various other advantages and features of novelty which characterize the invention are pointed out with

2 particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

DETAILED DESCRIPTION OF THE PREFERRED EMBODIMENTS

Figure 1:
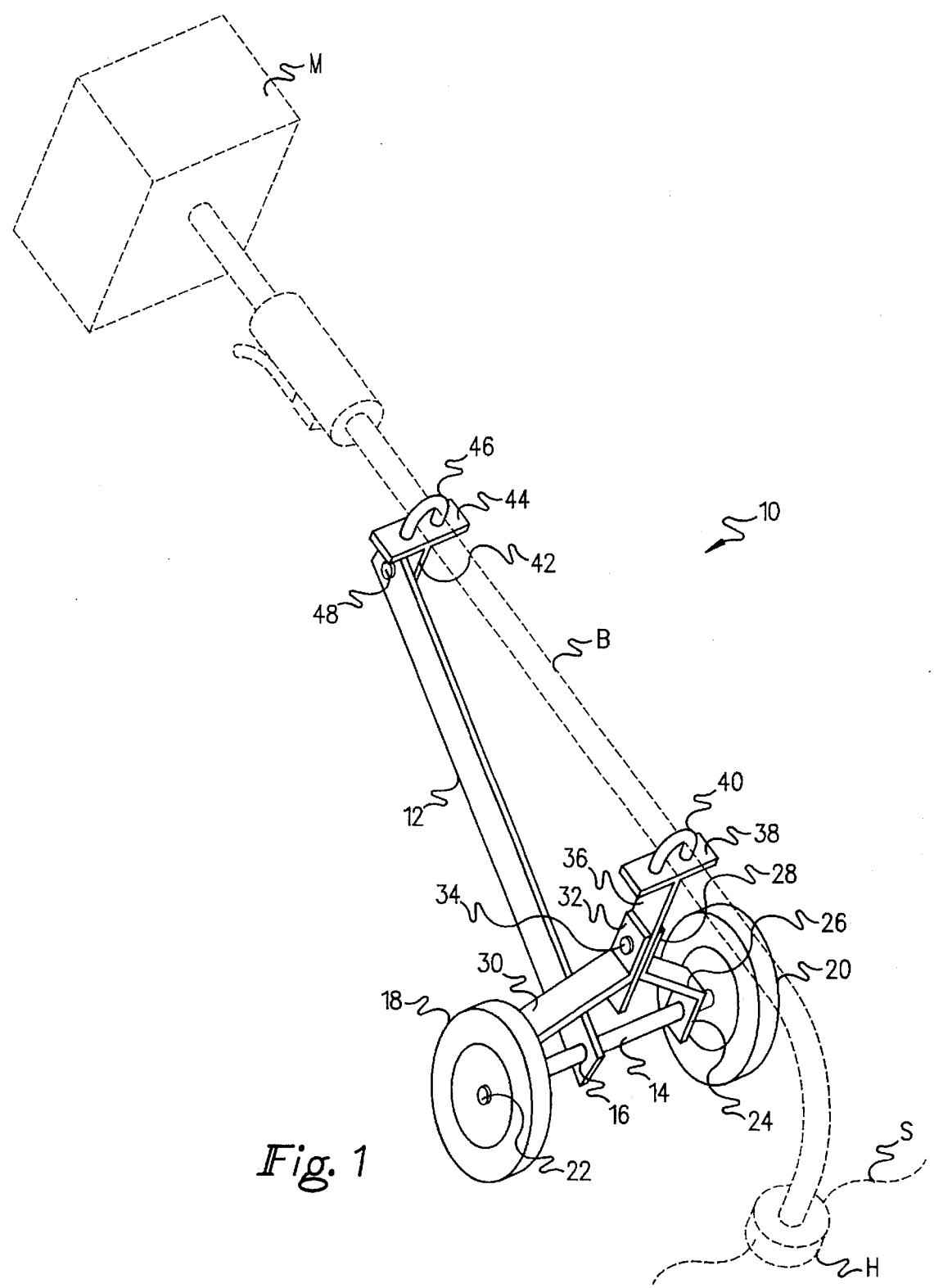
FIG. 1 is a perspective view of a dolly for portable weed cutters according to a first embodiment of the present invention.
Figure 4:
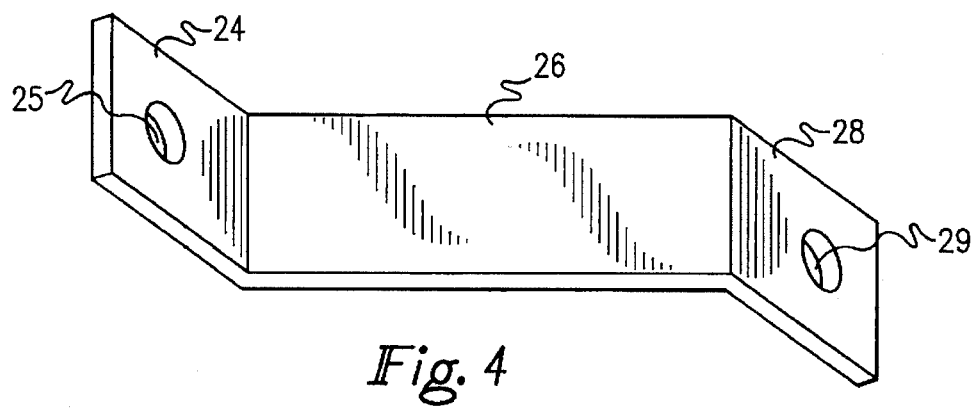
FIG. 4 is a perspective view illustrating a lower side frame member of the dolly shown in FIG. 1.

Referring now to the drawings, wherein like reference numerals designate corresponding structure throughout the views, and referring in particular to FIG. 1, an improved dolly for portable weed cutters 10 according to a first embodiment of the invention includes an upper frame portion comprising a central linear strut 12 having at a lower end an aperture 16 through which extends in press-fit relation a transverse axle 14. Fasteners 22 rotatably connect a pair of wheels in spaced relation at opposite ends of the axle 14, in a well known manner. In addition to the axle 14, a lower frame portion of the dolly 10 includes a pair of symmetrical lower frame members forming a "wish-bone" configuration. With reference to FIGS. 1 and 4, one of the lower frame members includes oppositely obliquely angled portions 24 and 28 connected by a linear central portion 26. A first aperture 25 on the portion 24 receives the axle 14 therethrough, in a slip-fit manner such that the lower frame member may be rotatably adjusted about the axle. A second end of the lower frame member includes an aperture 29 which receives a fastener 34 for securing the lower frame member to a body portion 36 of a lower clamp member 40. The opposite lower frame member is similarly constructed, with the upper angled portion 32 and linear central portion 30 visible in FIG. 1.

Figure 5:
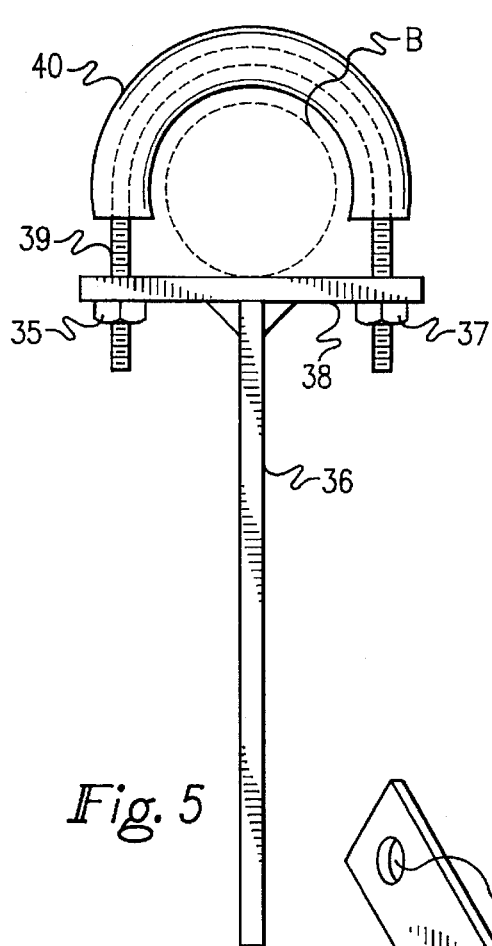
FIG. 5 is a front elevational view illustrating a lower clamp member of the dolly of FIG. 1 adapted for attachment to a handle bar of a conventional portable weed cutter.
Figure 6:
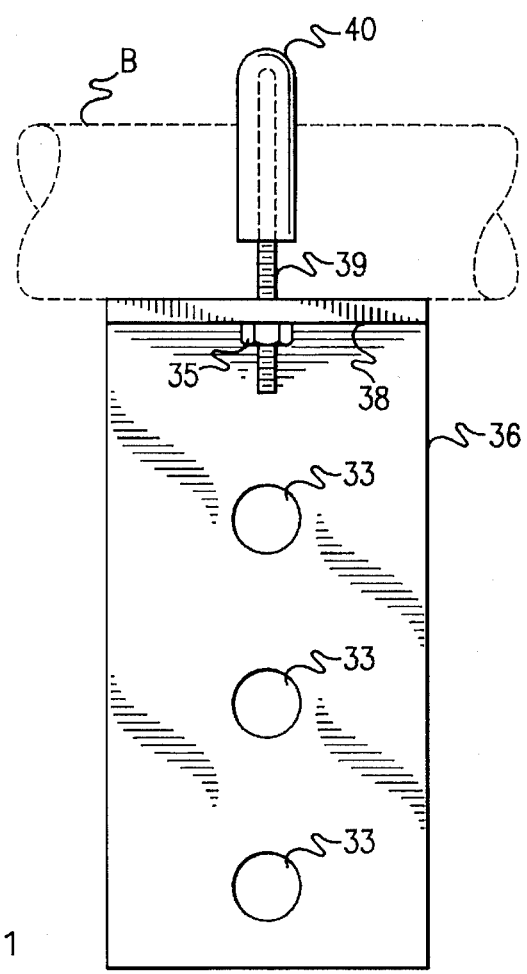
FIG. 6 is a side elevational view of the clamp shown in FIG. 5.
Figure 7:
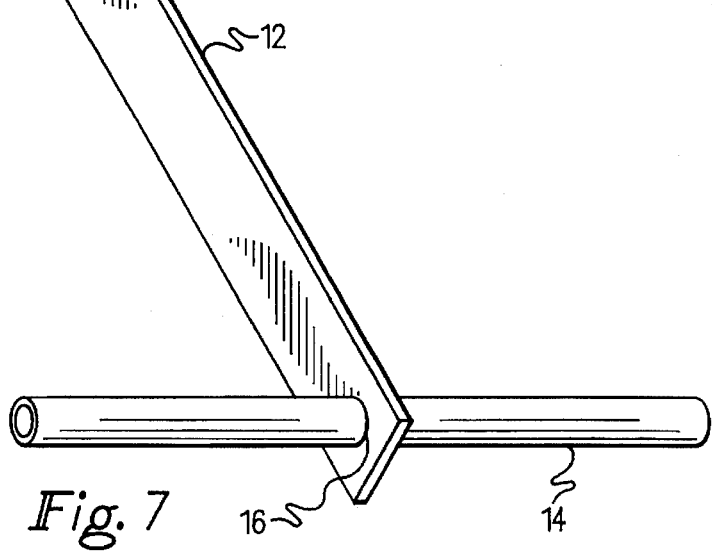
FIG. 7 is a perspective view illustrating central frame member and axle components of the dolly of FIG. 1.

With reference to FIGS. 1, 5, and 6, the lower clamp member 40 comprises a U-bolt 39 disposed in a rubber sleeve and secured to a cross bar 38 by nuts 35 and 37. Tightening of the nuts 35 and 37 clamps the handle bar B of a conventional portable weed cutter in a selected adjusted position. An elongated body portion 36 of the lower clamp member includes a plurality of spaced apertures 33, such that the spacing of the lower clamp member 40 relative to the axle 14 may be linearly adjusted in discrete increments by selective insertion of the fastener 34 through one of the apertures 33. This adjustment regulates the height of the head H of a portable weed cutter, for example of the type which includes at an upper end an electric or gasoline motor M for rotatably driving the head H to cause trimming line or string S to sever weeds and grass.

Figure 2:
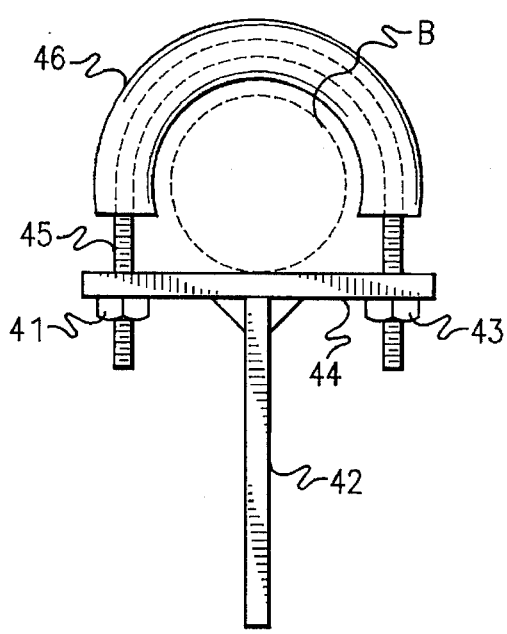
FIG. 2 is a front elevational view illustrating an upper clamp member of the dolly of FIG. 1 adapted for attachment to a handle bar of a conventional portable weed cutter.
Figure 3:
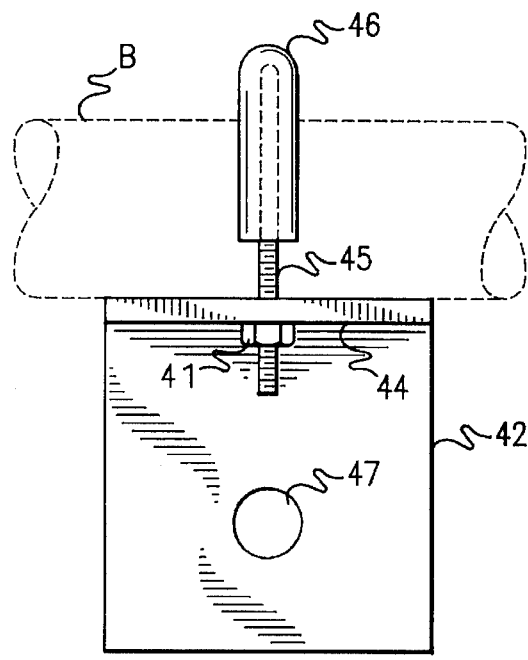
FIG. 3 is a side elevational view of the clamp shown in FIG. 2.

With reference to FIGS. 1, 2, and 3, the dolly 10 includes an upper clamping member 46 comprising a U-bolt 45 disposed within a rubber sleeve and secured to a cross bar 44 by a pair of nuts 41 and 43. An aperture 47 in a body portion 42 of the upper clamping member 46 receives a fastener 48 for pivotally adjustably securing the upper clamping member 46 to an upper end of the strut 12.

The dolly 10 thus centrally supports the handle bar B of a portable weed cutter above the clamps 40 and 46, the strut 12, and the axle 14, providing a safe and secure support. In addition, the dolly 10 has a high degree of adjustment flexibility to accommodate various different types and brands of weed cutters, by virtue of the following adjustment modes: (1) the bar B may be slid linearly within the clamps 40 and 46; (2) the clamp 46 pivots about the axis of the fastener 48, prior to tightening of the fastener; (3) the axle 14 rotates within the apertures 25 of the lower frame members; (4) the lower clamp 40 adjusts linearly by virtue of apertures 33; and (5) the lower clamp 40 pivots about the axis of the fastener 34 prior to tightening of the fastener.

Figure 8:
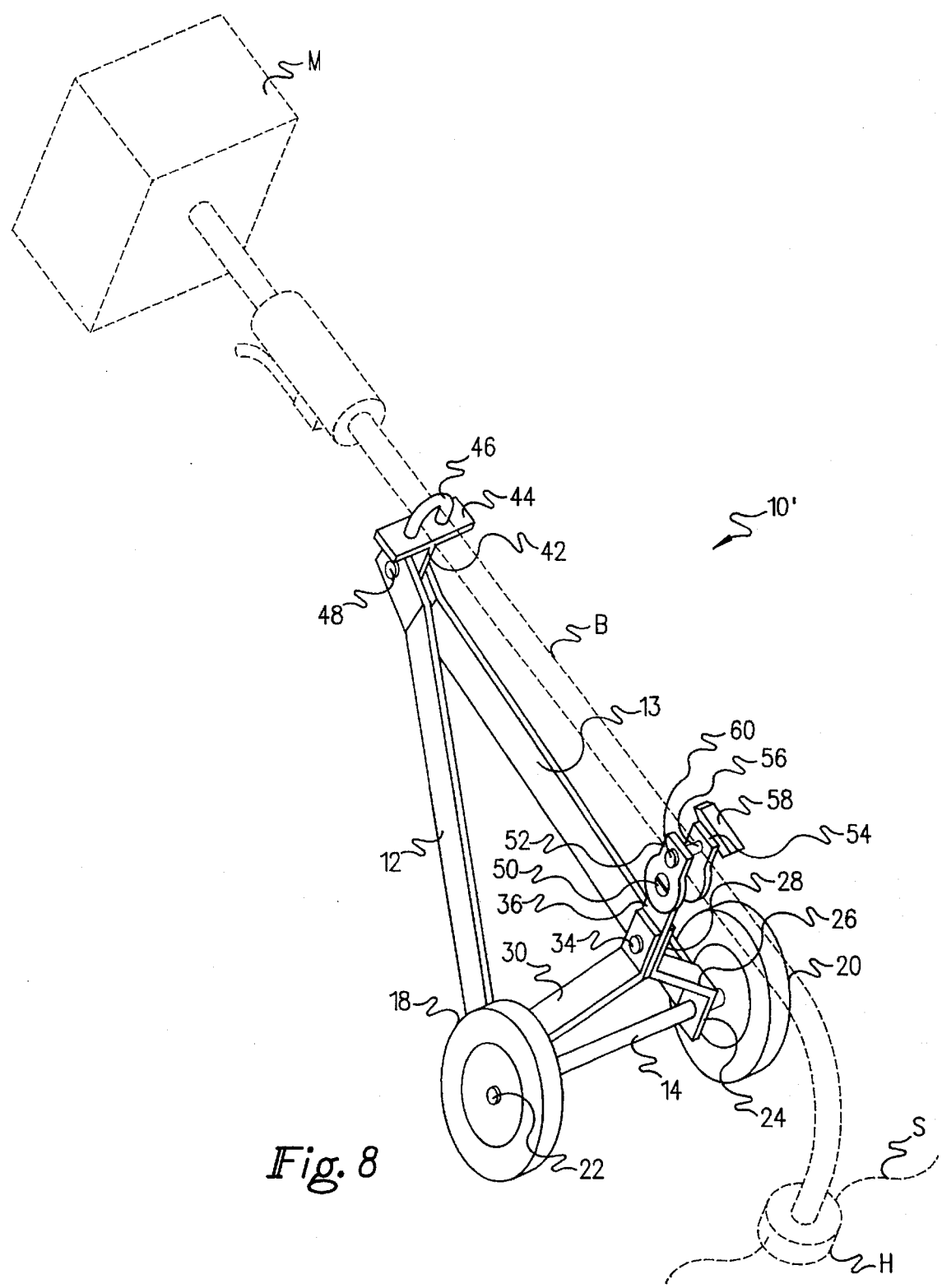
FIG. 8 is a perspective view illustrating a dolly for portable weed cutters according to a second embodiment of the present invention.

FIG. 8 illustrates a dolly 10' according to a second, and currently preferred embodiment of the invention, similar in many respects to the first embodiment 10 illustrated in FIGS. 1–7. Accordingly, like reference numbers have been used to designate similar components. The dolly 10' differs from the dolly 10 in two major respects. First, a pair of diverging upper frame members 12 and 13 replace the single upper frame strut 12 employed in the dolly 10. The upper frame members 12 and 13 form a Y configuration, with the body 42 of the upper clamp 46 sandwiched between parallel upper portions of the frame members 12 and 13. Lower ends of each of the upper frame members 12 and 13 rotatably receive the axle 14 therethrough. Second, the lower clamp member comprises a bifurcated screw actuated type clamp, including a pair of jaws 52 and 54 connected by a clamping screw 56 secured by a nut 60. Manual rotation of a handle 58 tightens the jaws 52 and 54 into engagement with the handle bar B. The lower clamp is secured to the body 36 by a pivot screw 50, which provides for an additional mode of adjustment of the dolly 10'. The dolly 10' has a high degree of adjustment flexibility to accommodate various different types and brands of weed cutters, by virtue of the following adjustment modes: (1) the bar B may be slid linearly within the clamps; (2) the clamp 46 pivots about the axis of the fastener 48, prior to tightening of the fastener; (3) the axle 14 rotates within the apertures 25 of the lower frame members; (4) the axle 14 rotates within apertures at the lower ends of the upper frame members 12 and 13; (5) the lower clamp adjusts linearly by virtue of apertures 33 in the body 36; (6) the lower clamp pivots about the axis of the screw 50 prior to tightening of the screw; and (7) the lower clamp pivots about the axis of the fastener 34 prior to tightening of the fastener.

It should be noted that if desired, the upper clamp member 46 may also be constructed to comprise a bifurcated screw actuated type clamp like that just described for the lower clamp member of the dolly 10'.

In the case of both of the dollys 10 and 10', a user may also selectively rotate the handle bar B of the weed cutter within the upper and lower clamps, to adjust the angle of the cutting plane.

While the various components of the frames of the dollys 10 and 10' are preferably constructed from steel sheet metal, other materials such as aluminum, fiberglass, graphite composites, etc. may also be employed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A dolly for portable weed cutters, comprising:
   a frame including an upper frame portion connected to a lower frame portion;
   an axle rotatably mounting a pair of wheels in spaced parallel relation on said lower portion of said frame, said lower portion of said frame mounted for rotational adjustment about said axle;
   an upper clamp member mounted on said upper portion of said frame for engagement with a handle bar portion of a conventional weed cutter, said upper clamp member mounted for selective pivotal adjustment about an axis substantially parallel to said axle; and
   a lower clamp member mounted on said lower portion of said frame for engagement with a handle bar portion of a conventional weed cutter, said lower clamp member mounted for selective pivotal adjustment about an axis substantially parallel to said axle, and said body portion of said lower clamp member mounted for selective linear adjustment on said lower portion of said frame in a direction substantially transverse to said axle.

2. The dolly of claim 1, wherein said upper clamp member comprises a U-bolt.

3. The dolly of claim 1, wherein said lower clamp member comprises a U-bolt.

4. The dolly of claim 1, wherein said lower clamp member comprises a bifurcated screw actuated clamp.

5. The dolly of claim 1, wherein said upper frame portion comprises a substantially linear strut having a lower end portion substantially centrally mounted on said axle.

6. The dolly of claim 5, wherein said upper and lower clamp members each substantially overlie said upper frame member.

7. The dolly of claim 1, wherein said lower clamp member includes a body portion having a plurality of spaced apertures, and further comprising a fastener extending through each of said lower portion of said frame and one of said apertures in said body portion of said lower clamp member for adjustably securing said lower clamp member to said lower portion of said frame.

8. The dolly of claim 1, wherein said upper portion of said frame includes a pair of substantially symmetrical upper frame members each having a first end connected to said upper clamp member and a second end mounted on said axle adjacent a respective one of said wheels.

9. A dolly for portable weed cutters, comprising:
   frame means including upper frame means and lower frame means;
   an axle mounting a pair of wheels in spaced relation for rotation on said lower frame means, said lower frame means mounted for rotational adjustment about said axle;
   upper clamp means mounted on said upper frame means for engagement with a handle bar portion of a conventional weed cutter;

means for selectively pivotally adjusting said upper clamp means about an axis substantially parallel to said axle;

lower clamp means mounted on said lower frame means for engagement with a handle bar portion of a conventional weed cutter;

means for mounting a handle bar of a conventional weed cutter for selective sliding adjustment in said upper and lower clamp means;

means for linearly adjusting said lower clamp means in a direction substantially transverse to said axle; and means for adjusting said lower clamp member pivotally about an axis substantially parallel to said axle.

10. The dolly of claim 9, wherein said lower clamp means comprises a U-bolt.

11. The dolly of claim 9, wherein said lower clamp means comprises a bifurcated screw actuated clamp.

12. The dolly of claim 9, wherein said upper frame means comprises a substantially linear strut having a lower end portion substantially centrally mounted on said axle.

13. The dolly of claim 9, wherein said upper and lower clamp means each substantially overlie said upper frame means.

14. The dolly of claim 9, wherein said lower clamp means includes a body portion having a plurality of spaced apertures, and further comprising a fastener extending through said lower frame means and one of said apertures in said body portion of said lower clamp means for adjustably securing said lower clamp means to said lower frame means.

15. The dolly of claim 9, wherein said upper portion frame means includes a pair of substantially symmetrical upper frame members each having a first end connected to said upper clamp means and a second end mounted on said axle adjacent a respective one of said wheels.

16. A dolly for portable weed cutters, comprising:

a frame including an upper frame portion and a lower frame portion;

a lower region of said upper frame portion substantially transversely connected to an axle;

a region of said upper frame clamp member pivotally mounted on an upper portion for engagement with a handle bar portion of a conventional weed cutter, said upper clamp member comprising a U-bolt;

said axle extending between and connecting a pair of wheels, said lower portion of said frame mounted for rotational adjustment about said axle;

said lower frame portion comprising a pair of substantially symmetrical lower frame members, each having a lower end mounted on said axle adjacent a respective one of said wheels; and a lower clamp member pivotally mounted to upper ends of said lower frame members for engagement with a handle bar portion of a conventional weed cutter, said lower clamp member including a body portion having a plurality of spaced apertures, and further comprising a fastener extending through each of said lower frame members and one of said apertures in said body portion of said lower clamp member for adjustably securing said lower clamp member to said lower frame members, such that said dolly provides the following adjustment modes: (1) the handle bar of the weed cutter may be slid linearly within said upper and lower clamp members, (2) said upper clamp member may be selectively pivotally adjusted about an axis substantially parallel to said axle, (3) said axle rotates relative to said lower frame members, (4) said lower clamp member adjusts linearly in a direction substantially transverse to said axle, and (5) said lower clamp member adjusts pivotally about an axis substantially parallel to said axle.

17. The dolly of claim 16, wherein said upper frame portion comprises a substantially linear strut having a lower end portion substantially centrally mounted on said axle.

18. The dolly of claim 16, wherein said upper portion of said frame includes a pair of substantially symmetrical upper frame members each having a first end connected to said upper clamp member and a second end mounted on said axle adjacent a respective one of said wheels.

19. The dolly of claim 16, wherein said lower clamp member comprises a U-bolt.

20. The dolly of claim 16, wherein said lower clamp member comprises a bifurcated screw actuated clamp.

* * * * *